United States Patent [19]

Billiotte et al.

[11] Patent Number: 4,720,870
[45] Date of Patent: Jan. 19, 1988

[54] METHOD OF AUTOMATICALLY AND ELECTRONICALLY ANALYZING PATTERNS IN ORDER TO DISTINGUISH SYMMETRICAL PERCEPTIBLE AREAS IN A SCENE TOGETHER WITH THEIR CENTERS OF SYMMETRY

[76] Inventors: Jean-Marie Billiotte, 8 place des Federes, 93160 Noisy Le Grand; Thierry Bouin, Residence Le Nerprun, 28500 Boutigny; Frédéric Basset, 33 rue Fremicourt, 75015 Paris; Jacques Beauvois, 3 place des Vosges, 75004 Paris, all of France; Didier Primat, 15 chemin de Bois Caran Collonge Bellerive, 1245 Geneva, Switzerland

[21] Appl. No.: 10,673

[22] Filed: Feb. 4, 1987

[51] Int. Cl.⁴ .............................................. G06K 9/00
[52] U.S. Cl. ........................................ 382/8; 358/101; 358/107; 356/237
[58] Field of Search ..................... 382/8, 48; 358/106, 358/107, 101; 356/237, 376

[56] References Cited

U.S. PATENT DOCUMENTS

| | | | |
|---|---|---|---|
| 3,074,634 | 1/1963 | Gamo | 382/65 |
| 4,500,202 | 2/1985 | Smyth | 382/8 |
| 4,566,125 | 1/1986 | Clunn | 382/48 |
| 4,578,810 | 3/1986 | MacFarlane et al. | 382/8 |
| 4,593,406 | 6/1986 | Stone | 382/8 |
| 4,661,984 | 4/1987 | Bentley | 382/8 |

OTHER PUBLICATIONS

Danielsson et al, "Distance Checking Algorithms", Linköping University, Department of Electrical Engineering, S-581 83, Linkoping, Sweden, LiTH-ISY-I--0175, 9/21/1977.

*Primary Examiner*—Leo H. Boudreau
*Assistant Examiner*—Steven Brim
*Attorney, Agent, or Firm*—Sughrue, Mion, Zinn, Macpeak and Seas

[57] ABSTRACT

Patterns (f) in a scene (S) are analyzed in order to automatically distinguish symmetrical perceptible areas (P) in the pattern (f), even if said symmetrical perceptible areas (P) are intersected by auxiliary patterns (F). A digitized image (Id) is used, and a test point (cO) located inside the digitized pattern (fd) is used as a starting point. A sequence of circles of increasing diameter is drawn around the test point. Whenever one such circle (COⁱ) intersects the digitized pattern (fd) a new center (c1) is chosen, offset from the preceding center (c0) in a direction going away from the point of intersection. By iteration, a sequence of test points (cn) is thus constructed which, for a symmetrical pattern, converges on its center of symmetry (c).

13 Claims, 7 Drawing Figures

METHOD OF AUTOMATICALLY AND ELECTRONICALLY ANALYZING PATTERNS IN ORDER TO DISTINGUISH SYMMETRICAL PERCEPTIBLE AREAS IN A SCENE TOGETHER WITH THEIR CENTERS OF SYMMETRY

The present invention relates to optical, digital, and electronic methods of automatically analyzing and recognizing patterns in a scene.

The invention relates more particularly to distinguishing perceptible areas which are symmetrical and to automatically determining their centers of symmetry, with it being possible for the perceptible areas to be randomly located in the scene and for them to be intersected by auxiliary patterns.

The method in accordance with the invention for automatically distinguishing symmetrical perceptible areas and for automatically seeking their centers of symmetry is particularly applicable whenever:

the patterns in the scene under consideration are constituted by the symmetrical perceptible areas whose centers of symmetry are to be determined together with auxiliary patterns which may interest them and are distinguished from the background of the scene by virtue of a different gray level after the scene has been observed by a camera and the camera output has been digitized; and the symmetrical perceptible areas differ geometrically from the auxiliary patterns which touch them by virtue of the fact that their transverse dimensions are (at least locally) greater than those of the auxiliary patterns, such that the symmetrical perceptible areas constitute swellings relative to the auxiliary patterns intersecting them.

BACKGROUND OF THE INVENTION

Various methods are known for automatically seeking symmetrical portions of patterns. These methods are used, for the most part, in the following circumstances:

reading plans, maps, or drawings;

as a programming aid for providing a numerically controlled drilling machine with a program based on a reference artwork; and seeking reference points for automatically controlling robots and positioning systems.

The present invention is described using the technical terms "digitizing" and "pixel".

The "digitizing" covers expressing the positions and/or values of picture elements in digital form, in particular for electronic computing purposes.

The term "pixel", i.e. picture element, covers, in conventional manner, any of the following:

a smallest or "elementary" unit of an image in digital form;

an elementary unit in the basic structure of an image-receiving sensor, for example a charge-coupled device (CCD); and an elementary unit of a digital image as reconstituted on a screen or as stored in memory after the image has been detected by a sensor and has been processed electronically.

The problem of automatically seeking the centers of symmetrical shapes has been adequately solved in the prior art providing:

the perceptible areas of symmetrical shape are also simple in shape (e.g. circles, squares, . . . ); and they are distinct from one another and are not combined with auxiliary patterns coming into contact therewith.

For example, French patent application No. 82 00706 (BORNELEC) describes an automatic method and apparatus for reading artwork showing printed circuit pads. The method is solely applicable to centrally symmetrical pads, and more particularly to circular pads. It is essential for there to be no other type of auxiliary pattern in the scene. The method provided proceeds by looking for successive midpoints of line segments intersecting the edges of the pads in orthogonal X and Y directions. The method starts from a point situated on the side of the pad. The horizontal extent of the pad is measured in a first direction (e.g. X) at this level. Thereafter, the perpendicularly bisecting segment through the pad is determined. The center of the pad is assumed to be the midpoint of said perpendicularly bisecting segment. This method may be implemented by using a single optoelectronic cell which is moved relative to the artwork in mutually perpendicular X and Y directions. The method is thus capable of being applied both simply and effectively. However, it is completely unusable in the common event that the artwork includes auxiliary patterns such as lines interconnecting the pads.

Also, U.S. Pat. No. 4,163,212 (W. R. BUERGER, K. K. DIXON and J. F. MONIER) describes a method and an apparatus for automatically recognizing the centers of connection pads for integrated circuits. The perceptible areas representing the pads are approximately rectangular in shape. The recommended method consists, essentially, in analyzing the scene in parallel lines along at least two perpendicular directions X and Y. For each of the directions X and Y, the curves of the centers of the segments constituted by the analysis line intersecting the rectangular perceptible area is determined. The center of the perceptible area is taken to be the intersection of said curves representative of the centers along the various analysis directions. This method works with simple patterns such as rectangles for accurately determining the centers of the perceptible areas, provided the perceptible areas are alone in the scene and are independent. If the scene includes additional auxiliary patterns, the method ceases to work.

When the perceptible areas whose centers of symmetry are to be found are attached to auxiliary patterns, the prior art provides effective solutions only for a few very special cases where the perceptible areas include identifying features.

In particular, French patent application No. 75 09 846 (G. GLIN and J. L. AMIAR) describes a method and an apparatus for providing assistance in programming a numerically controlled drilling machine on the basis of artwork representing printed circuits. This method is applicable to artwork including both pads and interconnecting lines. The method relies on giving a distinctive appearance to the perceptible areas to be identified. For example the distinctive appearance may be transparent by providing a central hole in the middle of the pads to be drilled. The image of the artwork is digitized in windows, the image is then analyzed and areas of the image possessing the distinctive appearance are identified. In particular, the central holes of the pads are recognized, as is the background region situated between the interconnecting lines (which is an error). Finally, those areas possessing the distinctive appearance and touching the edge of the image window are extracted. It is thus possible to identify solely those perceptible areas which are constituted by holes in the middles of pads. This method thus operates, a priori, perfectly well for any artwork having pads provided with central holes. However, it gives rise to errors and is thus not usable, for example with artwork having areas to be etched in the middle of ground planes, since these areas are confused with center points. In addition, the method is completely unworkable in the more general case of perceptible areas which are constituted by pads which do not include central holes.

Similarly, U.S. Pat. No. 4,295,198 (R. K. COPELAND and R. J. DIMAGGIO) describes a method and apparatus for automatically determining center holes for pads in printed circuit artwork including interconnecting lines. This method is based on a series of tests for successively verifying correspondence between various criteria of increasing selectivity. The sequencing of the these tests in order is intended to increase the speed of operation of the method. When a blank pattern is discovered, each of the tests is applied in succession. The first test, "BURST", consists in verifying whether the pattern is larger than the largest possible hole. This provides a very rough preliminary selection. The next test, "L.PATH", consists in moving along the pattern following a path constituted by line segment portions which intersect the edges at right angles, also in order to verify a maximum size condition. This test tends to eliminate lines and therefore performs a second selection. Finally, the last test, "PATH", follows a contour and thus recognizes shapes of sufficiently small size having a closed contour. The method consists in assuming that all shapes which pass all three tests are pad center holes. This method is thus solely applicable to detecting pads by means of their center holes.

There is no general method provided in the prior art for automatically seeking symmetrical perceptible areas (such as pads) in the image of a scene (such as printed circuit artwork) in which the symmetrical areas are connected to auxiliary patterns (such as interconnecting lines), and for then determining the centers of the perceptible areas after they have been found. As a result no currently-known apparatus is capable of automatically and reliably finding symmetrical perceptible areas regardless of their particular patterns, when said areas may be connected to auxiliary patterns of any shape.

All of the existing solutions:

either require special patterns, thereby considerably limiting their usefulness;

or require identifiers to be added to the patterns to be found, thereby complicating overall implementation;

or else are unusable whenever the symmetrical perceptible patterns happen to be combined with auxiliary patterns. However the present invention as claimed seeks to provide an overall solution for the above problems.

SUMMARY OF THE INVENTION

The present invention solves the problem consisting:

in automatically distinguishing randomly distributed symmetrical perceptible areas without risk of error; and in automatically determining the co-ordinates of the centers of symmetry of said perceptible areas;

when said perceptible areas are to be found in a scene including both:

said randomly distributed symmetrical perceptible areas; and any auxiliary patterns meeting and intersecting said perceptible areas; providing:

the patterns constituted the said perceptible areas, (optionally combined with the auxiliary patterns) can be distinguished from the background scene by a difference in gray level after digitizing ($\underline{n}$ for the perceptible areas and $\underline{b}$ for the background); and the perceptible areas are distinguishable from the auxiliary patterns, at least locally, by the fact that they have transverse dimensions which are greater than those of the auxiliary patterns, thereby constituting a local swelling in the shape observed on the scene.

The invention provides the following advantages:

the search for symmetrical areas is fully automated and is applicable to numerous industrial applications such as automatic control of robots, automatic orientation of objects, automatic reading of plans, maps, or drawings, and automatic programming of digitally controlled machines;

the method is universal and is automatically applicable to all kinds of scene provided it includes such symmetrical perceptible areas, and in spite of any possible auxiliary patterns of various shapes which may meet them;

the method is very fast and operates simply, thereby enabling it to be used in real time on a microprocessor; and the method is capable of being hard-wired, thereby giving rise to extremely short execution times.

To this end, the general method of the invention consists, after identifying a pattern within a scene by virtue of the gray level of one of its points, in determining whether a center of symmetry exists by increasing the size of a family of circles inside the shape and by determining the largest possible inscribed circle. The general method of the invention relies on the following observation: the largest circle which can be inscribed within a symmetrical figure is always centered on the center of symmetry of the figure.

BRIEF DESCRIPTION OF THE DRAWINGS

Implementations of the invention are described by way of example with reference to the accompanying drawings, in which:

FIG. 2' shows a detail of FIG. 2 after being digitized;

MORE DETAILED DESCRIPTION

Figure 1:
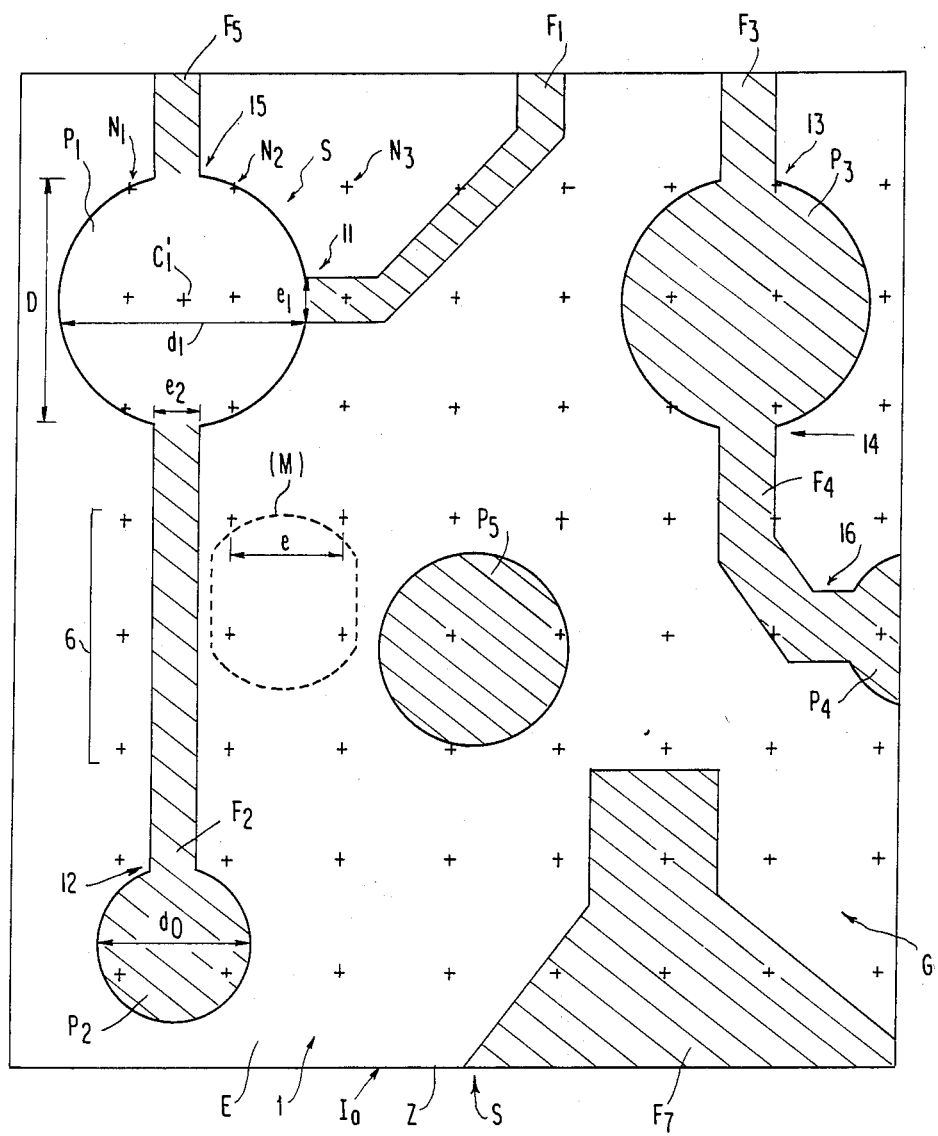
FIG. 1 is a diagrammatic view of a portion of printed circuit artwork, in which the principle used by the invention for identifying a shape in a scene is shown.

FIG. 1 shows a portion Z of printed circuit artwork 1. This artwork 1 is made on transparent plastic material and has pads $P_1$, $P_2$, $P_3$, $P_4$, and $P_5$, and interconnecting lines $F_1$, $F_2$, $F_3$, $F_4$, together with ground areas $F_7$, with said patterns on the transparent plastic being produced photographically to be an opaque black color.

The scene S constituted by the artwork 1 is backlighted, for example using a light-box system (not shown) so as to show up clearly:

the patterns $\underline{f}$ constituted by the pads $P_1, \ldots, P_5$, the interconnecting lines $F_1, \ldots$, and the ground areas $F_7$, which all appear in black; and the background E of the scene which appears in white.

Printed circuit artwork 1 serves two essential purposes in the manufacture of printed circuits:

firstly, the artwork serves as a mask through which a photoresist is exposed on a copper-epoxy substrate, such that after developing and etching there remains a pattern of pads and connections and ground planes on the epoxy to constitute the printed circuit; and they are also used as a measuring reference when programming numerically controlled machines for drilling the circuits, in order to provide holes through which component leads will subsequently be inserted.

The method in accordance with the invention may advantageously be used for automatically programming the drilling of printed circuits on the basis of such artwork 1.

The scene S constituted by the artwork 1 comprises patterns $\underline{f}$ constituted:

firstly by symmetrical perceptible areas S to be identified which are constituted in this case by pads $P_1, \ldots, P_5$, whose center co-ordinates (e.g. the co-ordinates of $c'_1$) must be determined for drilling purposes; and auxiliary patterns F which are constituted by lines $F_1, \ldots, F_4$, and ground planes $F_7, \ldots$ The pads $P_1, \ldots, P_5$ are disposed randomly on the artwork 1.

The auxiliary patterns $\underline{F}$ are of no use in programming drilling and serve merely to complicate the process of seeking pads $P_1, \ldots, P_5$ since they intersect the pads at connection locations 11, 12, 13, 14, 15, and 16.

However, it may be observed that the pads $P_1, \ldots$ have transverse dimensions $d_1$ which are locally larger than the widths $e_1, e_2, \ldots$ of the lines $F_1, F_2, \ldots$ which meet them. As a result the pads constitute swelling relative to the auxiliary patterns which intersect them.

In addition, the pads $P_1, \ldots, P_5$ are observable by virtue of the fact that they are centrally symmetrical since they are circular in shape.

The automatic pattern analysis method in accordance with the invention seeks:

firstly to automatically distinguish the pads $P_1, \ldots$, from the auxiliary patterns $F_1, \ldots$, which are not symmetrical; and secondly to automatically determine the centers $c'_1, \ldots$, of the pads $P_1, \ldots$ accurately.

To do this, a first stage consists in using a camera (not shown) to input an image window Ia covering a portion Z to be analysed of the artwork, said portion including patterns $\underline{f}$. FIG. 1 is constituted by one such window Ia.

Figure 2:
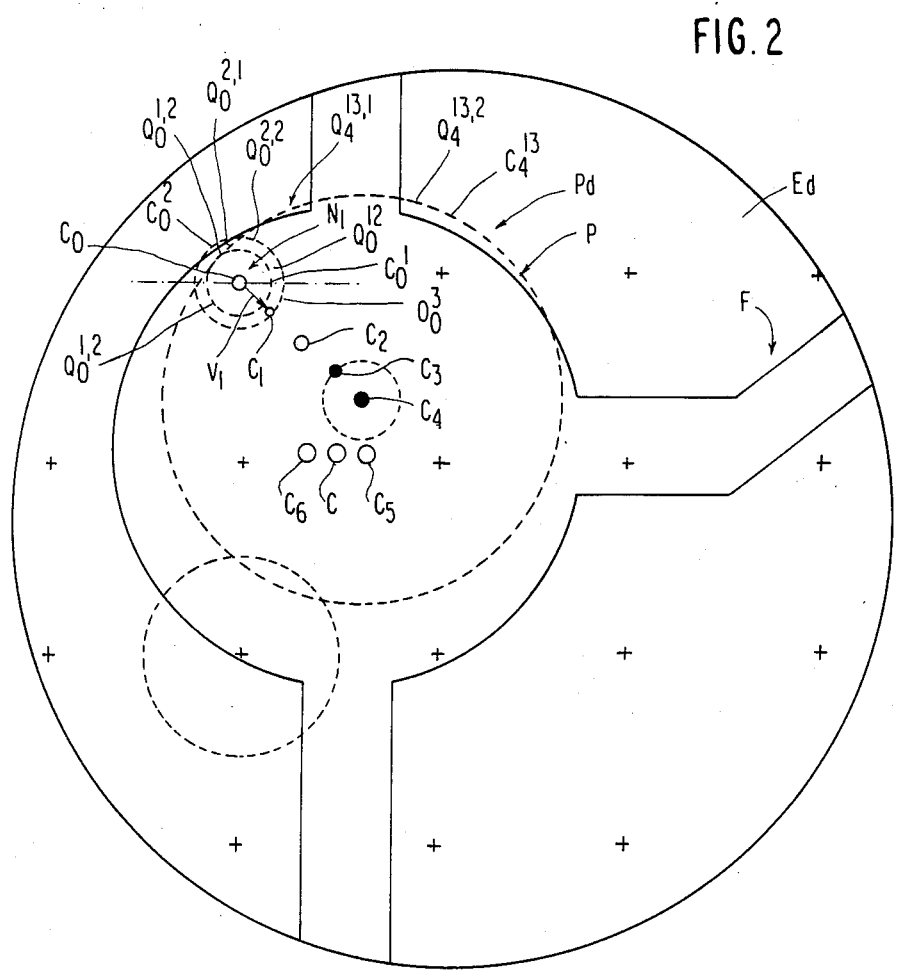
FIG. 2 is a fragmentary view of the FIG. 1 printed circuit artwork, in which the automatic method for seeking a center of symmetry in accordance with the invention is shown diagrammatically.
Figure 2:
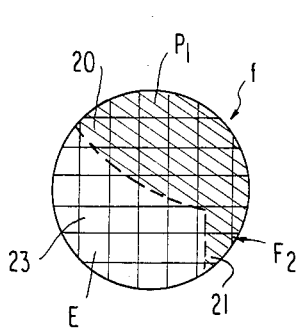

A second stage consists in digitizing the window Ia, i.e. in storing an electronic image of the window in digitized form Id, with a portion of such a digitized image being shown in FIG. 2'.

Different binary values are associated with patterns $\underline{f}$ and with background E as a function of their gray levels. In particular, squares (e.g. 20, 21) lying over the patterns $\underline{f}$ and in particular lying over the pads ($P_1$) and lines ($F_2$) are associated with the binary digit zero which corresponds, in the present example, to the color black. Likewise, squares (e.g. 23) belonging to the background E are associated with the digit one which corresponds to the color white. The electronic image processing method in accordance with the invention is performed on the digitized image Id.

A third stage serves to fix at least one first test point c0 within each pattern $\underline{f}$ likely to form a part of a symmetrical perceptible area P, and in particular a pad $P_1$. A recommended method in accordance with the invention for doing this is described with reference to FIG. 1. This method consists in scanning the entire scene S and in discovering all of the symmetrical perceptible areas P in amongst said patterns $\underline{f}$. This is done by using a test grid G having a plurality of nodes $N_1, N_2, N_3, \ldots$ at a constant pitch M, with the grid covering the entire scene S. Each node $N_1, N_2, N_3, \ldots$ of the grid G is used as a starting point for systematically analyzing the binary level (zero or one) of the digitized image Id representative of the gray level of the corresponding point $N_1, N_2, \ldots$ Nodes $N_1, N_2, \ldots$ located inside patterns $\underline{f}$ and in particular inside the pads $P_1$ are thus distinguished from nodes $N_3$ situated on the background. Nodes $N_1$ situated inside digitized patterns $\underline{fd}$ constitute subsequent test points for performing the electronic pattern-analysis method.

Thus, point $N_1$ situated inside pad $P_1$ constitutes a test point c0. During a fourth stage, shown in greater detail in FIG. 2, a family of concentric circles $C0^k$ is drawn or scanned around the point c0, with $\underline{k}=1, 2, \ldots$.

The circles are of increasing diameter $\overline{dk}$. The circles $C0^k$ are made within the digitized image $\overline{Id}$ in discrete manner by juxtaposing pixels. For the purposes of simplification, they are shown as being drawn using dashed lines in FIG. 2. Thus, circules $C0^1$ and $C0^2$ are shown drawn around test point c0.

Each circle $C0^k$ is divided into $\underline{q}$ circular arcs $Q0^{k,1}$ where $1 < q$, corresponding to $\underline{q}$ sectors $O0^1$ distributed around an approximate center c0. In the present case, $q=4$. The circles $C0^1 C0^2 \ldots$ are thus divided into four sectors or quarters $Q0^{1,1}, Q0^{1,2}, \ldots, Q0^{2,1}, Q0^{2,2}, \ldots$ corresponding to the four quarters $O0^1$ around the test point c0.

For each circle $C0^k$, a test is performed to determine whether the circle $C0^k$ is fully contained within the corresponding digitized pattern $\underline{fd}$. So long as the circles $C0^k$ are completely contained within a digitized pattern $\underline{fd}$, as is the case for the circle $C0^1$, the diameters $\underline{dk}$ of the circles $C0^k, C0^{k+1}, \ldots$ are progressively enlarged.

In contrast, as soon as one of the circles $C0^i$ in the family, for example the circle $C0^2$ intersects the digitized figure $\underline{fd}$, i.e. as soon as at least one point $\underline{e}$ of the circle $C0^2$ lies outside the digitized pattern $\underline{fd}$ and therefore corresponds to digitized background $\overline{Ed}$, the number q0 of circular arcs $Q0^{ij}$ of the circle $C0^i$ which intersect the digitized pattern $\underline{fd}$ is determined.

When only one arc $Q0^{2,1}$ of the circle $C0^2$ intersects the digitized pattern (the usual case), a seventh stage consists in selecting a new test point c1 which is offset away from the arc $Q0^{2,1}$ which intersects the digitized pattern $\underline{fd}$. The procedure is then iterated starting from the new test point c1 running through stages four to seven described above. A series of test points c1, c2, c3, $\ldots$, cn is thus created. It sometimes happens (as for test point c4) that the first circule $C4^{13}$ intersects the pattern $\underline{fd}$ with two of its arcs $Q4^{13,1}$ and $Q4^{13,2}$. Then, in accordance with the invention, it is recommended to choose a new test point c5 which is shifted away from both of the arcs in question intersecting the digitized pattern $\underline{fd}$. The stages of the method are then iterated again.

It can be seen that from point c5 the sequence of test points $\underline{cn}$ remains stationary about the midpoint $\underline{c}$.

The application of the method in accordance with the invention then consists:

in considering the pattern $\underline{f}$ being analyzed as corresponding in all liklihood to a pad P; and in assuming that the center of said pad is $\underline{c}$.

When pads having two axes of symmetry are to be processed, for example oblong pads, it may happen that symmetrically opposite arcs intersect the digitized pattern while the sequence of centers $\underline{cn}$ is converging towards the center of symmetry. In order to take account of this situation (not shown) an even number q of arcs is selected, e.g. four. In each family of circles $Cn^k$ the arcs $Qn^{k1}$ are grouped into symmetrically opposite pairs. Each time that a first circle $Cn^i$ of a family of circles $Cn^k$ centered on a test point $\underline{cn}$ intersects a digitized pattern $\underline{tfd}$ as the circle diameter $\underline{dk}$ is being increased, account is taken of symmetrical pairs of arcs in which only one of the arcs is intersecting the pattern. So long as there exists at least one such pair of arcs which intersect the pattern asymmetrically, a new test point c(n+1) is selected which is offset from the previous test point $\underline{cn}$ in a direction going away from the sole pattern-intersecting arc of such a pair.

Figure 3:
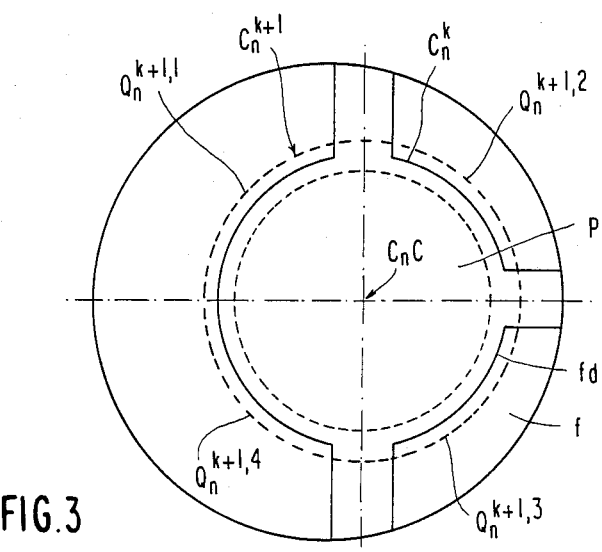
FIG. 3 shows the final stage of the method in accordance with the invention when identifying a presumed center of symmetry.

In any event, as shown in FIG. 3, the series of new test points $\underline{cn}$ is stopped within a digitized pattern $\underline{fd}$ as soon as the following conditions hold:

firstly there exists a circle $Cn^k$ centered on said test point $\underline{cn}$ and entirely contained within the digitized pattern $\underline{fd}$; and the next circle $Cn^{k+1}$ of the family centered on the test point $\underline{cn}$ has a number N of arcs $Qn^{k+1,1}$ intersecting the digitized pattern $\underline{fd}$ which is not less than a minimum acceptance threshold A, where $A \leq q$.

The test point $\underline{cn}$ is then taken to be the presumed center of symmetry $\underline{c}$ of a symmetrical perceptible area included in the pattern being analyzed.

In FIG. 3, the number of arcs is 4 (q=4). In addition the minimum acceptance threshold A is also chosen to be 4. The center $\underline{cn}$ satisfies the following pair of conditions;

there exists a circle $Cn^k$ centered on the test point $\underline{cn}$ and situated entirely inside the digitized pattern $\underline{fd}$; and all of the arcs $Qn^{k+1,1}$, $Qn^{k1+,2}$, $Qn^{k+1,3}$, $Qn^{k+1,4}$, of the circle $Cn^{k+1}$ intersect the digitized pattern $\underline{fd}$.

The point $\underline{cn}$ is taken to be the center of symmetry $\underline{c}$ of a symmetrical perceptible area P assumed to exist at the intersection of the pattern $\underline{f}$.

The performance of automatic searches for centers of symmetry $\underline{c}$ using the method in accordance with the invention may reach any desired level. It depends essentially on:

the size of the individual pixels 20, 21, . . . ;

the displacement step size between successive test points $\underline{cn}$, c(n+1), . . . ;

the change in diameter $\underline{dk}$ between successive test circles.

In accordance with the invention, it is recommended to apply the following considerations:

the pixel size should be less than or equal to the accuracy $\underline{s}$;

the diameter increment $d(k+1)-\underline{dk}$ should be less than or equal to the accuracy $\underline{s}$; and the elementary step size between two successive test points $\underline{cn}$ and c(n+1) should be less than the accuracy s.

In particular, with reference to FIG. 2, it is observed that the commonest displacement between two test points c0 and c1 is a vector V1 capable of taking any one four directions away from the arc $Q0^{k1}$ intersecting the pattern. In particular, it may be observed that the displacement between the centers c0 and c1 is a vector V1 which bisects the quarter $OO_3$ opposite to the quarter $OO^1$ of the arc $Q0^{21}$ intersecting the digitized pattern $\underline{fd}$.

When two non-opposite arcs of a first circle $\overline{Cn}^k$ centered on a test point $\underline{cn}$ intersect the digitized pattern $\underline{fd}$, then two elementary displacement vectors may be combined, as shown for the displacement c4 to c5.

In most cases, the series of diameters $\underline{dk}$ selected for the families of circles $Cn^k$ constitute a geometric progression such that $dk = (k + k0)D0$ which is identical for each family of circles $Cn^k$. I.e. the growth between two successive diameters is constant. In addition, the constant k0 and the argument D0 are chosen so that the first diameter $d1 = (1+k0)D0$ is substantially less than the transverse dimension d0 of the smallest pad $P^2$. the argument D0 is less than or equal to the absolute accuracy $\underline{s}$ desired in determining the centers of symmetry.

In addition, the test grid G preferably has a square mesh M of side e which is less than the dimension d0 of the smallest pad $P^2$. In this case, it is advisable for the argument D0 and the side $\underline{e}$ to satisfy the relationship $e + D0 < d0$, so as to be certain that at least a first circle $C0^1$ of a family of circles centered on a test point c0 is entirely situated inside each pattern which is analyzed.

Figure 4:
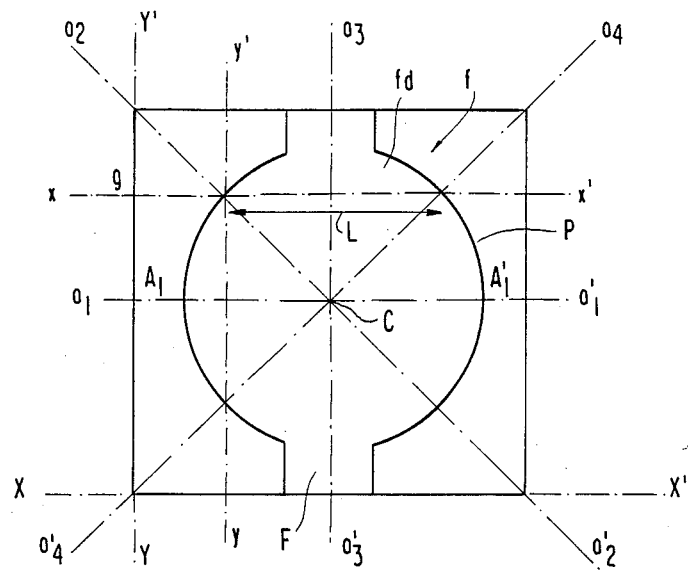
FIGS. 4, 5, and 6 describe an additional disposition of the method in accordance with the invention for confirming the correctness of an assumed center of symmetry.

When the assumed exact center of symmetry of an assumed perceptible area P is discovered inside a pattern $\underline{f}$, an additional confirmation test is performed and is described with reference to FIGS. 4, 5, and 6. This test is performed by analyzing the digitized pattern using a line-by-line scan in at least one direction X—X', and preferably in two directions, X—X' and Y—Y'.

When scanning along the direction X—X' the width L of the digitized pattern $\underline{fd}$ is measured along the second direction Y—Y'. The variation in width L of the digitized pattern as a function of position g is studied as shown in FIG. 6.

Figure 5:
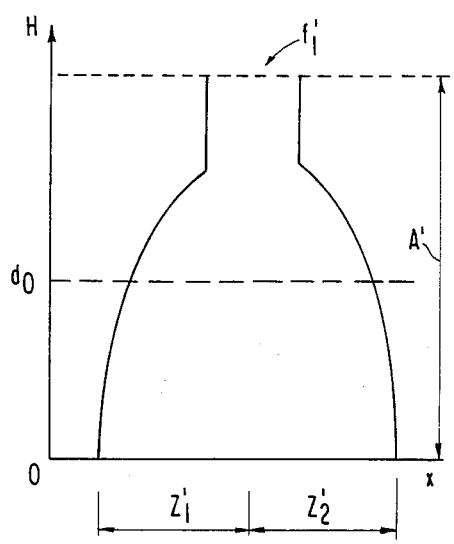

Similarly, the variation in height H of the pattern in the Y—Y' direction is studied as a function of the X—X' direction (see FIG. 5).

Figure 6:
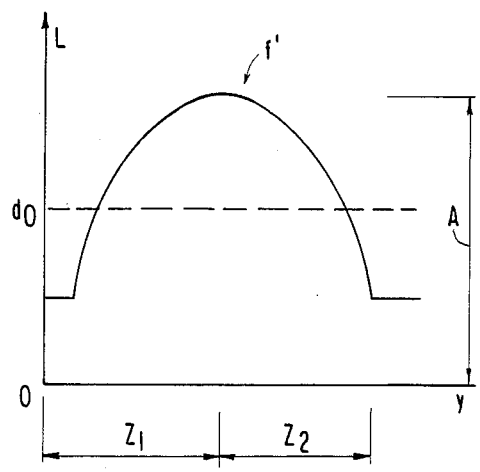

Since a pad P is larger than a line F intersecting it, it can be seen that each of the curves shown in FIGS. 5 and 6, has a first zone Z1, Z'1 where the measured dimension is increasing in size; and a second zone Z2, Z'2 where it is decreasing in size.

In accordance with the invention, it is advisable to confirm a presumed center of symmetry $\underline{c}$ solely if this requirement for increasing and then decreasing size is confirmed in each of two different directions.

It is also advisable to subject the presumed center c to a second test relating to maximum size. Patterns f containing a pad P have a maximum size A, A' which is not less than the diameter d0 of the smallest pad $P_2$. A presumed center of symmetry is therefore confirmed only if the changing size (L, H) of the pattern f has a zone H, H' where its size A, A' exceeds the transverse dimension d0 of the smallest pad $P_2$ in both directions X—X' and Y—Y'.

An additional method of confirming a presumed center of symmetry c consists in comparing the diameter of last circle Cn included inside a digitized pattern $\underline{fd}$ with the transverse dimension d0 of the smallest pad $\overline{P_2}$ in the scene S, and similarly in comparing the diameter d(n+1) of circle C(n+1) with the transverse dimensions $D = d1$ of the largest pad $P_1$. A presumed center of symmetry is thus only confirmed when the following are true:

$dn > d0$; and/or $d(n+1) < D$ or any equivalent relationship. It is then possible to consider that a pattern f contains a pad P having a center c and an inscribed circle of diameter dn.

Once the center c of a circular pad P has been determined and confirmed by the above methods, its diameter is then verified. To do this, the central size or amplitude of the pattern, i.e. the distance $(A_1 - CA'_1)$ is determined in a plurality of directions, e.g. four directions: $(a_1, a'_1)$, $(a_2, a'_2)$, $(a_3, a'_3)$, and $(a_4, a'_4)$. If the values $(A_1 - CA'_1)$ of the central amplitude match a value A0 to within y % and at least N times (where Y and N are predetermined parameters) the diameter of the pad P is considered to be Ao.

The above-described method, when implemented electronically can be used for automatically detecting any symmetrical perceptible areas P in a scene together with its center of symmetry c to any desired accuracy. This determination is independent of the presence or otherwise of auxiliary patterns F.

This method is particularly advantageous for use in any field requiring automatic analysis of images and patterns. It is particularly effective for automatically programming the drilling of printed circuits on the basis of the printed circuit artwork.

We claim:

1. A method of electronically analyzing patterns in a scene in order to automatically distinguish symmetrical perceptible areas amongst the patterns, said areas being intersected by auxiliary patterns and being disposed randomly in the scene, the method including determining the centers of symmetry of said symmetrical perceptible areas, with said perceptible areas and optionally said auxiliary patterns being distinguishable from the background of the scene by a gray level which, after digitizing, gives rise to a different binary level for pattern pixels and for background pixels;

the method consisting in identifying whether a pattern contains locally one of said symmetrical perceptible areas by:

using a camera to input a window of said scene including an area to be inspected for patterns;

digitizing said window in the form of a digital working image containing a digitized pattern; and fixing a test point C0 inside a digitized pattern;

said method including the improvement whereby:

a family of concentric circles of increasing diameter dk are drawn or scanned around the test point and are centered thereon, with each circle $C0^k$ being divided into q arcs $Q0^{k1}$, where $1 < q$, corresponding to q quarters $O0_1$ distributed around the test point;

so long as the circles of the family remain entirely contained within the digitized pattern, the diameters of the circles are caused to increase successively ($C0^k$, $C0^{k+1}$, ... );

as soon as a circle $C0^i$ intersects the digitized pattern fd, i.e. as soon as at least one point e of the circle $\overline{C0}^i$ lies outside the area of the pattern fd and corresponds to digitized background, the number q0 of arcs $Q0^{ij}$ of the circle $C0^i$ lies intersecting the digitized pattern fd is determined;

if only one arc of the circle intersects the digitized pattern (the most usual case), then a new test point c1 is selected which is shifted away from the preceding test point in the opposite direction to the direction of said arc $Q0^{ij}$ intersecting the pattern; and the steps of the method are iterated from the new test point, thereby creating a converging sequence of test points so long as each circle $Cn^k$ which intersects the digitized pattern continues to do so with only one of its arcs $Qn^{k1}$;

if the sequence of centers converges on a limiting point or becomes stationary in the vicinity of such a point, it is assumed that:

the pattern probably constitutes a symmetrical perceptible area; and is centered on said point.

2. A method according to claim 1, wherein the selected number q of arcs $Qn^{k1}$ is even, and in particular is equal to four, in all the families of circles $Cn^k$, with the arcs $Qn^{k1}$ being defined by quarters $On^1$ extending in fixed directions, and with the arcs $Qn^{k1}$ in each circle $Cn^k$ being grouped in symmetrically opposite pairs.

3. A method according to claim 2, wherein each time a first circle $Cn^i$ of a family of circles $Cn^k$ centered on a test point cn intersects the digital pattern fd under analysis by virtue of its diameter being increased, symmetrical pairs of arcs are sought in which only one arc of the symmetrical pair intersects the digitized pattern; and if at least one pair of arcs of this asymmetrical intersection type exists, then a new test point is selected which is shifted from the preceding test point in a direction opposite to that leading towards the sole intersecting arc of the said asymmetrical pair of arcs.

4. A method according to claim 1, wherein:

the series of test points cn within a digitized pattern fd is stopped at the instant when a test point cn of the series satisfies the following conditions:

firstly there exists a circle $Cn^k$ centered on said test point cn which lies entirely within the digital pattern being analyzed; and secondly the next circle $Cn^{k+1}$ of the family centered on the test point cn has a number N of arc $Qn^{k+1,1}$ intersecting the digitized pattern fd which is greater than a minimum acceptance threshold A where $A \leq q$; and the last test point cn is taken to be the center of symmetry of a perceptible symmetrical area in the pattern UNS /f/ .

5. A method according to claim 4, wherein:

the series of test points cn within a digitized pattern fd is stopped at the instant when a test point cn of the series satisfies the following conditions:

firstly there exists a circle $Cn^k$ centered on said test point cn which lies entirely within the digital pattern being analyzed; and secondly all of the arcs $Qn^{k+1,1}$ of the next circle $Cn^{k+1}$ of the family centered on the test point cn intersect the digitized pattern fd; and the last test point cn is taken to be the center of symmetry of a perceptible symmetrical area in the pattern f.

6. A method according to claim 1, wherein the series of diameters dk of the families of circles $Cn^k$ constitute a geometrical progression $dk = (k+k0)D0$ which is identical for each family of circles, in which the constant k0 is chosen in such a manner that the first diameter $d1=(1+k0)D0$ is less than the transverse dimension d0 of the smallest perceptible symmetrical area being sought, and where the argument D0 of the geometrical progression is substantially equal to the required absolute accuracy $\underline{s}$ in the automatic determination of the centers of symmetry.

7. A method according to claim 1, wherein an accuracy s is required and wherein the elementary displacement between two successive test points constitutes a vector (cn, c(n+1)) which:

is oriented substantially towards the direction of arc $Qn^{k+1,1}$ which is opposite to the arc $Qn^{k+1,1}$, which intersects the digitized pattern; and of constant constant length l less than or equal to the required absolute accuracy $\underline{s}$.

8. A method according to claim 1, in order to ensure that the entire scene is scanned and that all of the symmetrical perceptible areas contained in the patterns of the scene are detected, together with the centers of symmetry of each of them, the entire digitized image of the scene is systematically analyzed at a plurality of test points located at the nodes of a test grid of constant mesh to determine whether the binary level thereof is representative of background gray level or of pattern gray level, said grid covering the entire digitized scene, and each of said nodes being taken in succession as a first test point if its binary level corresponds to a portion of pattern.

9. A method according to claim 8, wherein the mesh of the test grid is square having a side $\underline{e}<d0$, where d0 is the smallest transverse size of a symmetrical perceptible area.

10. A method according to claim 4, for avoiding errors due to the presence of auxiliary shapes intersecting a symmetrical perceptible area and comprising:

measuring the digitized image in at least one direction X—X' to observe the change in the width of the digitized image in a second direction Y—Y' which is perpendicular to the first direction; and in confirming said presumed center of symmetry and the existence of a presumed symmetrical perceptible area only if the width of the pattern in the Y—Y' direction includes an increasing stage followed by a decreasing stage.

11. A method according to claim 10, for confirming the presumed center of symmetry of a symmetrical perceptible area, wherein the presumed center of symmetry is only confirmed if the digitized pattern includes a portion of width greater than the transverse dimension d0 of the smallest symmetrical perceptible area of the scene, said portion lying between said increasing stage and said decreasing stage.

12. A method according to claim 4, including, for each presumed center of symmetry discovered:

comparing the diameter $\underline{dn}$ of the last circle Cn included therein with the minimum transverse dimension d0 of the smallest symmetrical perceptible area in the scene; and/or comparing the diameter d(n+1) of the next circle C(n+1) with the transverse dimensions D0 of the largest perceptible area in the scene; and confirming that the presumed center of symmetry is an exact center of symmetry only if:

$dn \geq d0$; and/or $d(n+1) \leq D0$ or any equivalent comparison;

in which case the pattern $\underline{f}$ is considered to contain a symmetrical perceptible area having the determined center $\underline{c}$ and having the same diameter as the inscribed circle.

13. A method according to claim 1, including an additional step after the center of the perceptible area has been determined and confirmed of determining the central amplitudes of the digitized pattern in R directions, and in statistically analyzing the distribution of said central amplitudes, with the diameter $\underline{d}$ of the symmetrical perceptible area P being taken to be equal to A if the values of the central amplitudes are confirmed as having the value A (to within Y %) on at least N occasions.

* * * * *